US008577797B1

(12) United States Patent
Schuette et al.

(10) Patent No.: US 8,577,797 B1
(45) Date of Patent: Nov. 5, 2013

(54) ELECTRONIC CASH LETTER PROCESSING (75) Inventors: Bruce Schuette, Delaware, OH (US);
Chuck Loether, McMurray, PA (US);
Elizabeth Bauman, Edgewood, NM
(US); Mike Sprankle, Wexford, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 255 days.

(21) Appl. No.: 12/702,951

(22) Filed: Feb. 9, 2010

(51) Int. Cl.
*G06Q 40/00* (2012.01)
(52) U.S. Cl.
USPC ............................................. 705/39; 235/380
(58) Field of Classification Search
USPC ............................................. 705/39; 235/380
See application file for complete search history.

(56) References Cited

U.S. PATENT DOCUMENTS

| | | | |
|---|---|---|---|
| 7,181,430 B1 | 2/2007 | Buchanan et al. | |
| 7,216,106 B1 | 5/2007 | Buchanan et al. | |
| 7,440,924 B2 | 10/2008 | Buchanan et al. | |
| 7,475,040 B2 | 1/2009 | Buchanan et al. | |
| 2005/0171899 A1* | 8/2005 | Dunn et al. | 705/39 |
| 2006/0237526 A1 | 10/2006 | Mueller et al. | |
| 2006/0242062 A1* | 10/2006 | Peterson et al. | 705/42 |
| 2006/0248009 A1 | 11/2006 | Hicks et al. | |
| 2007/0094140 A1 | 4/2007 | Riney et al. | |
| 2007/0095888 A1 | 5/2007 | Mueller et al. | |
| 2008/0006687 A1 | 1/2008 | Mueller et al. | |
| 2008/0162319 A1 | 7/2008 | Breeden et al. | |
| 2009/0094148 A1 | 4/2009 | Gilder et al. | |

OTHER PUBLICATIONS

"NDpro™ ICL Solution," "Proven technologies that deliver value to banks, credit unions, processors, and their customers," 2008, NetDeposit, LLC, Salt Lake City, Utah, 2 pages.
Ray Higgins, Bill Lange, "Working with X9.37 Image Cash Letters (ICLs)," White Paper, *All My Papaers™*, Second Edition, Feb. 2008, 33 pages.
Steve Bills, "JPMorgan Chase Introduces Image Cash Letter Service," *American Banker*, Mar. 23, 2006, 2 pages.
U.S. Appl. No. 12/702,961, filed Feb. 9, 2010.
Office Action mailed Jan. 10, 2012 in U.S. Appl. No. 12/702,961.

* cited by examiner

*Primary Examiner* — Daniel Felten
(74) *Attorney, Agent, or Firm* — Buchanan Ingersoll & Rooney PC; Robert J. Pugh (57) ABSTRACT

Various embodiments are disclosed for processing image cash letter files comprising transactions directed to a first image exchange system and transactions directed to a second image exchange systems. First and second cash letter output files may be generated, where the first and second cash letter output files may comprise cash letter file headers based on a header of an input cash letter file. Each transaction record included in the input cash letter file may be directed to either the first output cash letter file or the second output cash letter file. The headers of the respective output cash letter files may be updated based on the records written thereto.

17 Claims, 6 Drawing Sheets

ELECTRONIC CASH LETTER PROCESSING

BACKGROUND

In a typical checking transaction, a maker or drawer writes a check to a drawee. The check is drawn on the maker's account at a drawer financial institution. To cash the check, the drawee presents the indorsed, physical check to the drawee's financial institution, usually in return for cash or a deposit to the drawee's account. The drawee's financial institution then presents the indorsed, physical check to the drawer financial institution for payment. Traditionally, this presentment involved transporting the physical check, often cross-country, to the drawer financial institution. Because of the bulkiness and inefficiency of physical presentment, many financial institutions now allow electronic presentment. Instead of providing a physical, indorsed check, drawee's and drawee financial institutions may now provide electronic image cash letters representing the physical check.

The adoption of electronic image cash letters by many financial institutions has streamlined the presentment process and created new service opportunities for customers and financial institutions alike. For example, financial institutions may provide some drawee customers with scanners and other equipment for generating electronic image cash letters. These customers may scan and deposit their checks electronically without the need to physically visit a branch of the financial institution. Also, drawee customers may utilize a lockbox service. The lockbox service may receive, aggregate and deposit checks made out to the drawee, again without physically visiting the financial institution. Further, cash flow service providers, such as, for example, BRINKS, may utilize electronic image cash letters to make various deposits and other similar transactions on behalf of their customers. According to current practice, however, files including electronic image cash letters are assembled to include only transactions relating to accounts handled by a single image exchange system (e.g., a single financial institution). Accordingly, if a party desires to make transactions on accounts held at multiple financial institutions, then multiple image cash letter files must be generated.

FIGURES

Various embodiments of the present invention are described here by way of example in conjunction with the following figures, wherein.

DESCRIPTION

Various embodiments of the present invention are directed to processing image cash letter files that include transaction records relating to accounts handled by more than one image exchange system (e.g., more than one financial institution). The embodiments may be useful in various different contexts. For example, when the operations of two financial institutions are merged, accounts may be transferred from one or more legacy image exchange systems to a new image exchange system (e.g., accounts from one institution may be transferred to the image processing of the other institution, or all accounts may be transferred to a new processing system). Depending on the size of the financial institutions and the number and type of accounts being transferred, the account transfer process may be protracted (e.g., over days, weeks, months, etc.). During the transfer process, the financial institution may receive image cash letter files comprising some transactions properly directed to the legacy system or systems and some transactions properly directed to the new system or systems. The embodiments disclosed herein may be implemented to split a single incoming image cash letter file into two or more files, directing the appropriate files to the appropriate image exchange system. In another context, some financial institution customers may want to generate omnibus image cash letter files without segregating transactions by financial institution. For example, a lockbox service or cash services provider may wish to avoid the need to segregate its image cash letter files by its customer's financial institutions. A financial institution, or non-financial institution service provider, may implement the systems and methods disclosed herein (e.g., for a fee) to allow customers to avoid sorting.

To perform the described file splitting, various embodiments may receive a single input cash letter file. From the input cash letter file, an output cash letter file may be generated for each image exchange system that is implicated. The output cash letter files may maintain the integrity of each transaction from the input cash letter file. In this way, it may not be necessary to add any extra settlement steps between the two image exchange systems. In addition, the cash letter structure of each output cash letter file may match the structure of the input cash letter file. In various embodiments, however, image cash letters that do not have a transaction directed to an image exchange system may be omitted from the cash letter file associated with that system.

Figure 1:
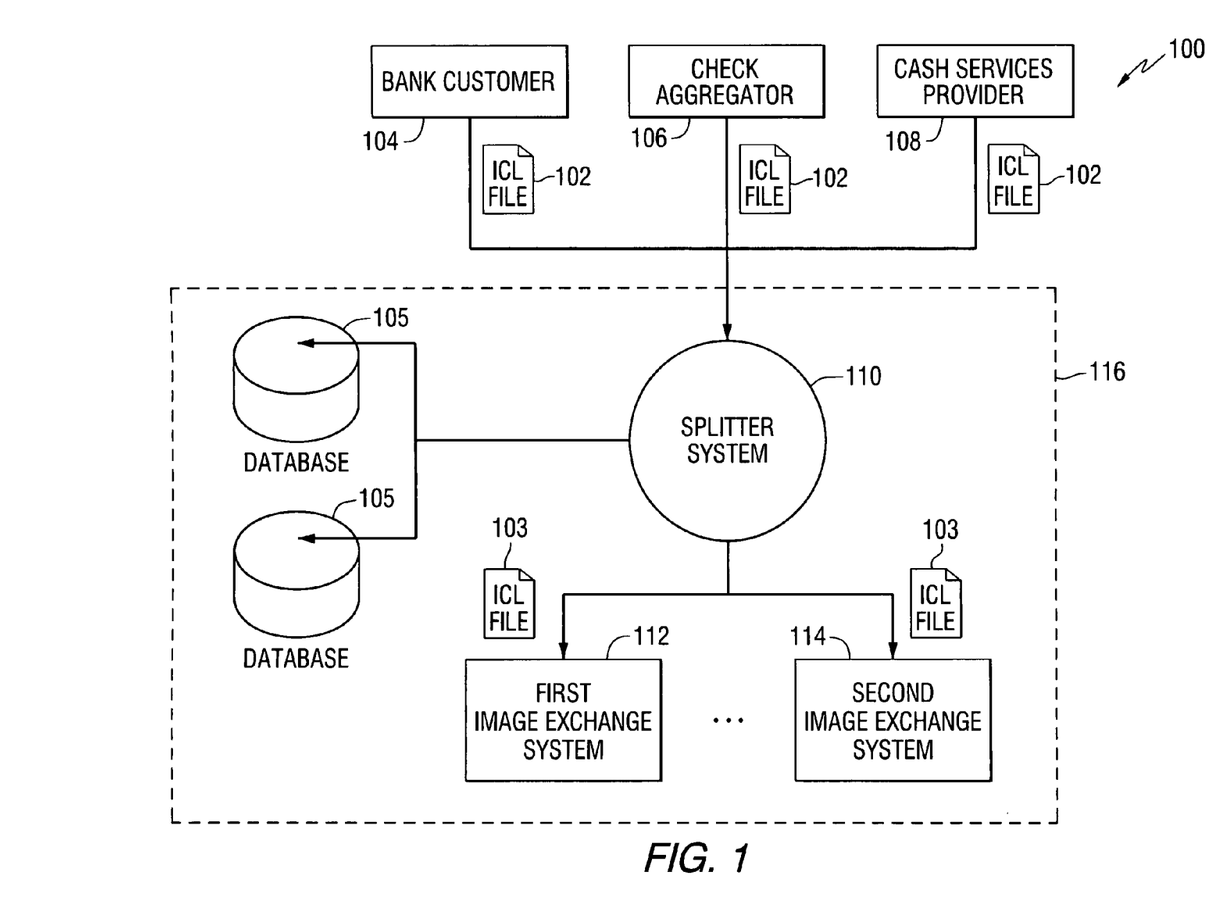
FIG. 1 illustrates one embodiment of a system for processing image cash letter files having transactions directed to multiple image exchange systems.

FIG. 1 illustrates one embodiment of a system 100 for processing image cash letter files having transactions directed to multiple image exchange systems. Input image cash letter (ICL) files 102 may originate from various parties. For example, a bank customer 104 may scan deposited checks on their premises and generate image cash letter files 102. Also, for example, a check aggregator 106 may receive deposited checks, or images thereof, from multiple parties and aggregate them into a single image cash letter file 102. A cash services provider 108 may also generate image cash letters 102 including various transactions related to its customers. The image cash letter files 102 may be transmitted to a splitter system 110 via any suitable electronic network or other transmission means such as, for example, the Internet. The splitter system 110 may generate output image cash letter files 103 for a first image exchange system 112 and a second image exchange system 114. According to various embodiments, the splitter system 110 may be in electronic communication with one or more databases 105. For example, the splitter system 110 may receive from the databases 105 various data including, for example, conversion data indicating accounts and corresponding image exchange systems 112, 114, data regarding image cash letter file format for the systems 112, 114, transaction types, etc. Also, according to various embodiments, the splitter system 110 may store one or more logs as a database 105.

Figure 2:
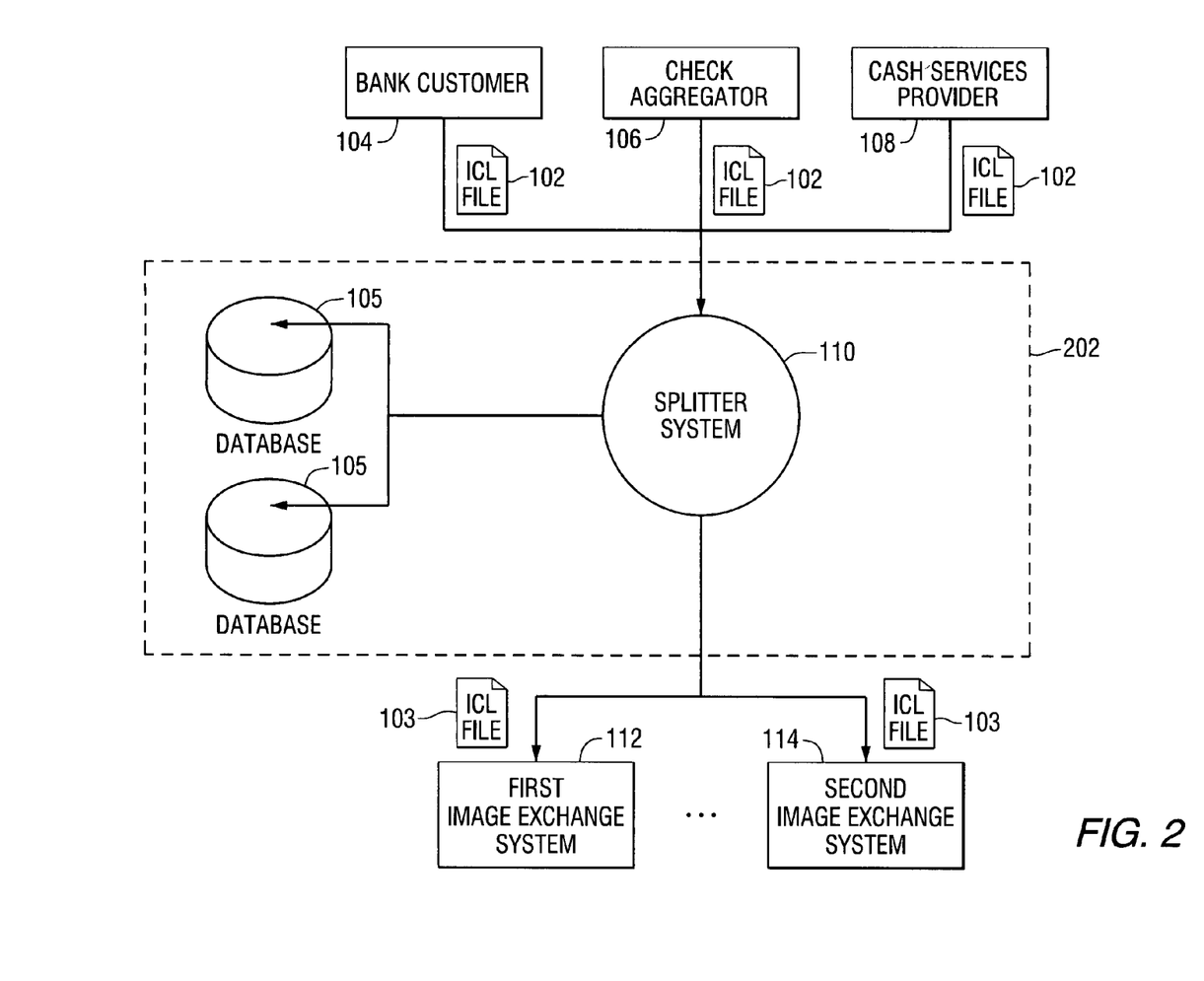
FIG. 2 illustrates one embodiment of the system of FIG. 1 where the splitter system is implemented by a third party.

Although two image exchange systems 112, 114 are shown, it will be appreciated that additional image exchange systems (not shown) may be supported. As illustrated in FIG. 1, the splitter system 110 and the exchange systems 112, 114 are implemented by a single entity 116. For example, the entity 116 may be a financial institution that is a successor to a merger or an acquisition and is converting accounts from one of the image exchange systems 112, 114 to the other. FIG. 2 illustrates one embodiment of a system 200 where the splitter system 110 is implemented by a third party 202. For example, as illustrated in FIG. 2, the first and second image exchange systems 112, 114 may be implemented by different financial institutions.

The splitter system 110 may comprise any suitable computer or computer hardware, which may, in turn, comprise at least one processor for processing image cash letter files 102. For example, according to various embodiments, the splitter system 110 may comprise one or more servers, mainframes, desktop computers, laptop computers and/or other suitable hardware. The splitter system 110 may also comprise one or more computer readable media having instructions thereon for causing the system 110 to implement the systems and methods described herein.

Figure 3:
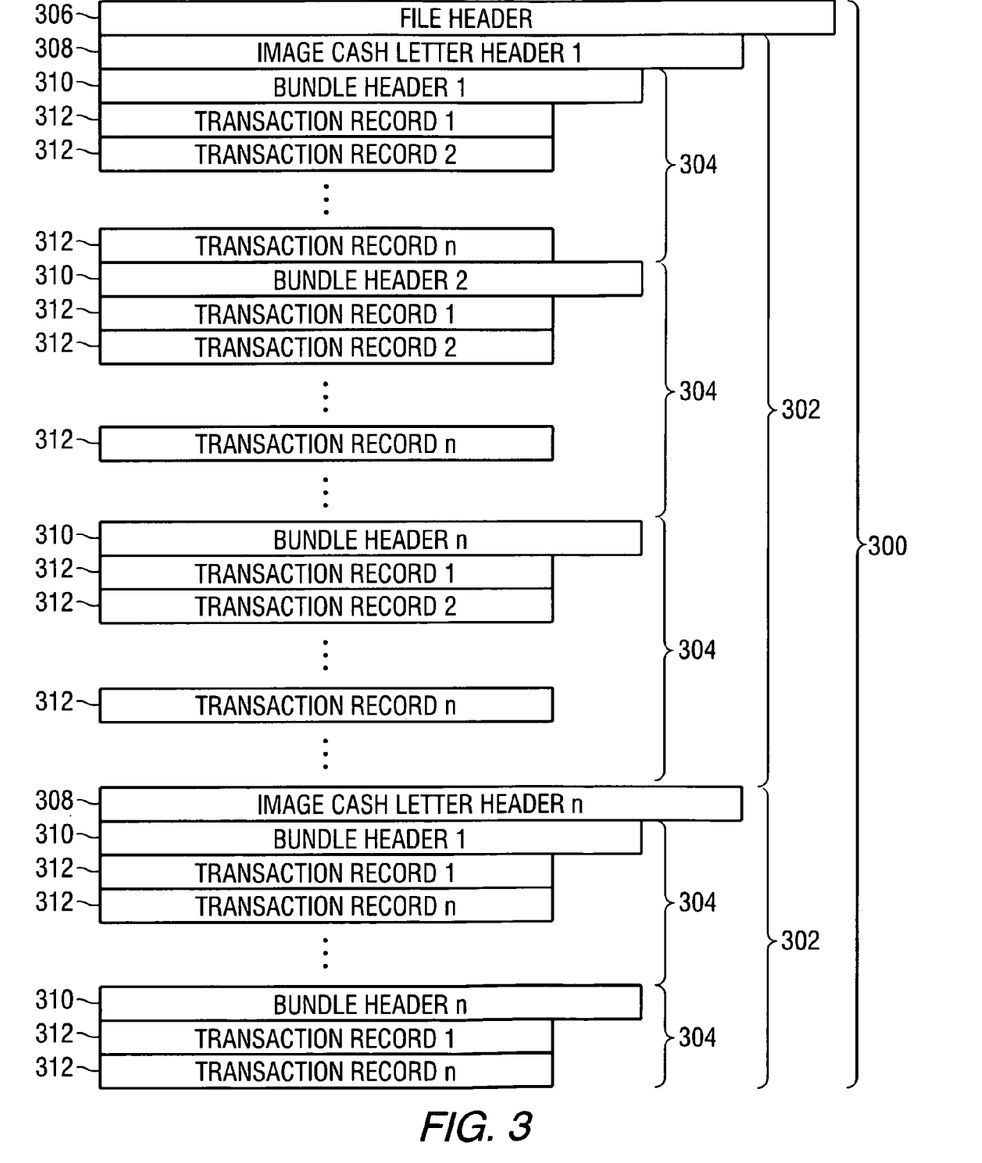
FIG. 3 is a diagram showing one embodiment of an example image cash letter file.

FIG. 3 is a diagram showing one embodiment of an example image cash letter file 300. The format of the file 300 may match that of an input image cash letter file 102 or any of the output cash letter files 103. The file 300 may comprise a plurality of transaction records 312 that may be organized according to any suitable format. For example, according to various embodiments, the transaction records 312 may be formatted according to the X9.37 DTSU standard, variations of the X9.37 DTSU standard, the X9.100-87 standard, or any other suitable image cash letter standard. According to various embodiments, the transaction records 312 may describe deposit transactions and may include images of checks to be deposited as well as indications of the credits and debits making up the deposit.

As illustrated in FIG. 3, and according to the X9.37 DTSU and X9.100-87 standards, the transaction records 312 are organized into image cash letters 302 and bundles 304. The file 300 may begin with a file header 306. The file header 306 may indicate the number of image cash letters 302 in the file. According to various embodiments, the file header 306 may also indicate the number of bundles 304 in each image cash letter and the number of transaction records 312 in each bundle. Each image cash letter 302 may similarly begin with a header 308. An image cash letter header 308 may indicate the number of bundles 304 in the image cash letter 302 and may also indicate the number of transactions records 312 in each bundle. Likewise, each bundle 304 may begin with a bundle header 310. The bundle header 310 may indicate the number of transaction records 312 in the bundle. It will be appreciated that the various headers 306, 308, 310 may indicate other information about the file 300 and its various components in addition to that described herein. Also, although the transaction records 312 are divided into bundles 304 and image cash letters 302, it will be appreciated that any subdivision of transaction records 312 within an image cash file 300, including bundles 304 and image cash letters 302, may be generically referred to as a bundle.

Figure 4:
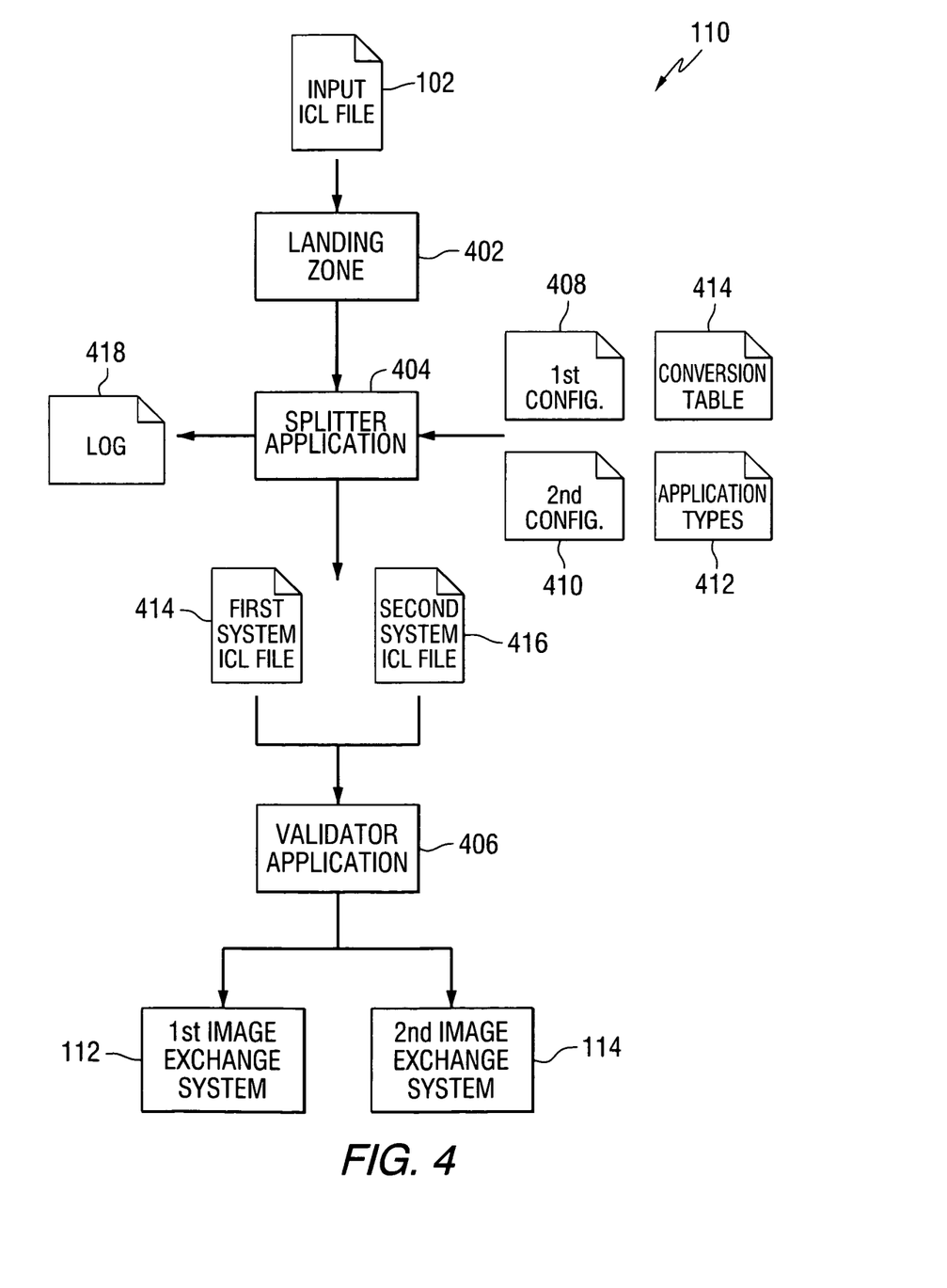
FIG. 4 illustrates a workflow diagram of one embodiment of the splitter system of FIG. 1.

FIG. 4 illustrates a workflow diagram of one embodiment of the splitter system 110. An input image cash letter file 102 is received at a landing zone 402. The landing zone may be a storage location (e.g., at one of the databases 105) where input image cash files, such as 102, may be stored until they are processed by the splitter application 404. The splitter application 404 may be implemented according to any suitable object-oriented or non-object-oriented method. According to various embodiments, the splitter application 404 may receive various values as input including, for example, the input image cash letter file 102 via the landing zone 402. In addition, the splitter application 404 may receive configuration data 408, 410 describing the specific image cash letter format utilized by each of the target image exchange systems 112, 114. Conversion data 414 may indicate correlation between accounts and image exchange systems. For example, when a financial institution is converting accounts from a first image exchange system 112 to a second image exchange system 114, the conversion data 414 may indicate which accounts have been converted. Application data 412 may indicate the treatment of different transaction types in the systems 112, 114.

The splitter application 404 may take an input image cash letter file 102 and break it into separate output image cash letter files 414, 416, with one output cash letter file per image exchange system. According to various embodiments, the splitter application 404 may also generate a log 418, as described herein. Upon creation, the output cash letter files 414, 416 may be analyzed by a validator application 406. The validator application 406 may verify that the files 414, 416 are in the proper format for their respective image exchange systems 112, 114.

Figure 5:
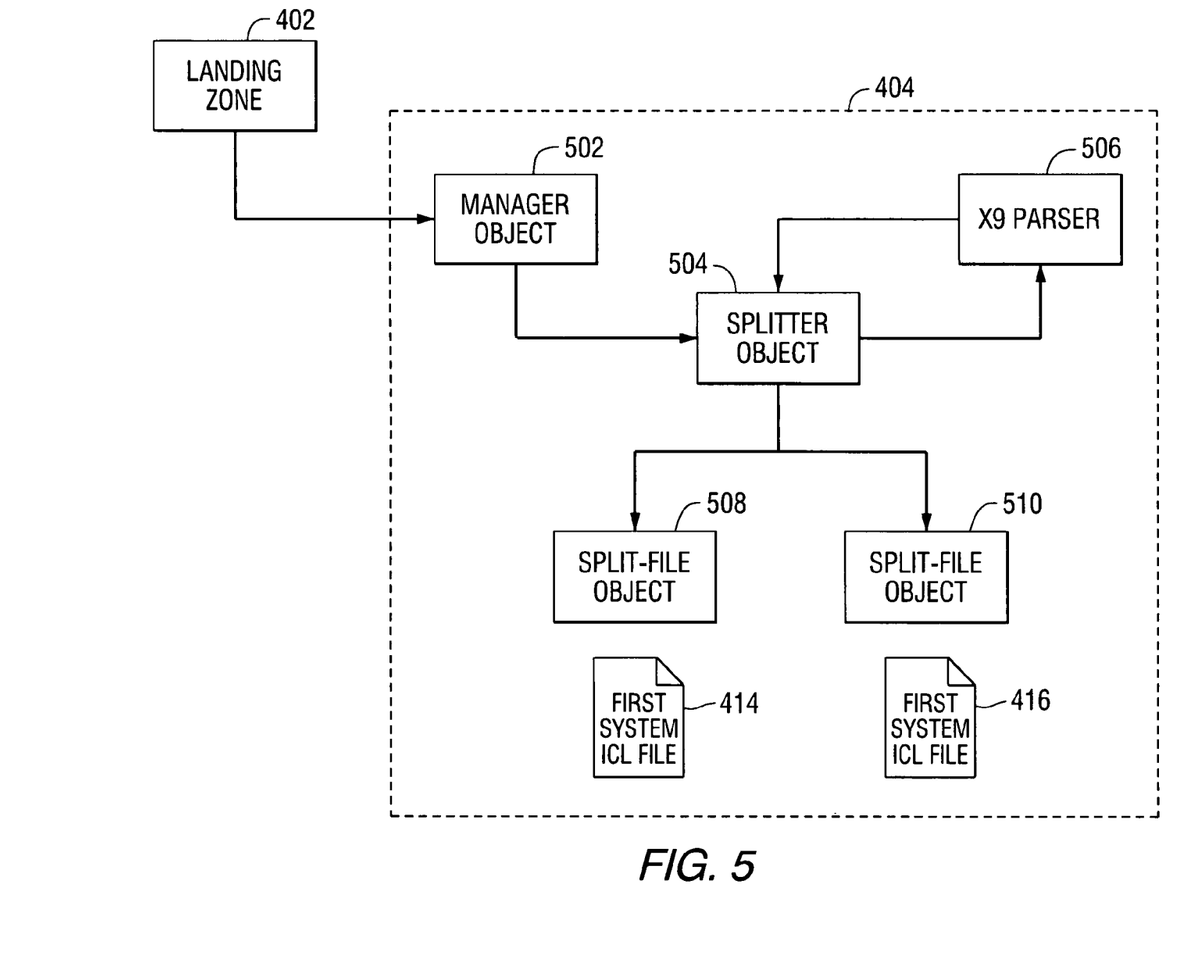
FIG. 5 is a diagram of an implementation of the splitter application shown in FIG. 4 according to one embodiment.

FIG. 5 is a diagram of an implementation of the splitter application 404 according to one embodiment. The implementation shown in FIG. 4 is an object-oriented implementation, although, it will be appreciated that any suitable implementation may be used. As shown in FIG. 5, a manager object 502 may retrieve input image cash letter files 102 (FIG. 4) from the landing zone 402. For each image cash letter file 102, a splitter object 504 may be executed. The splitter object 504 and/or the manager object 502 may initiate the execution of an instance of an image cash letter parser object 506 and two split-file objects 508, 510. The split-file objects 508, 510 may correspond to the first and second image exchange systems 112, 114, respectively (FIG. 4). In examples where there are more than two output image exchange systems, there may be more than two cash file objects 508, 510. According to various embodiments, each of the split-file objects 508, 510 may be instances of the same object called with different parameters.

The image cash letter parser object 506 may parse the input image cash letter file 102 record-by-record, providing each record, in turn, to the splitter object 504. The splitter object 504 may apply logical rules to determine (e.g., based on the conversion data 414) whether the current record should be directed to the split-file object 508 corresponding to the first image exchange system 112, the split-file object 510 corresponding to the image exchange system 114 or both.

Referring now to both FIGS. 3 and 5, as records from the input image cash files 112 are provided to the splitter object 504 by the image cash letter parser object 506, the splitter object 504 may pass headers 306, 308, 310 to each of the pending split-file objects 508, 510. Each of the split-file objects 508, 510 may create the respective output image cash letters 414, 416 with the headers 306, 308, 310 received from the splitter object 504. As transaction records 312 are received by the splitter object 504, it may determine which split-file object 508 is creating an output image cash letter 414, 416 corresponding to the image exchange system 112, 114 handling the account associated with the transaction record 312. The record 312 may be forwarded to the appropriate object 508, 510, which may write the record 312 to its associated output image cash letter 414, 416. At the conclusion of a bundle 304, the respective split-file objects 508, 510 may update the bundle header 310 associated with the bundle 304 based on the transaction records 312 that were actually written to each output image cash letter file 414, 416. For example, object 510 may write to the appropriate bundle header 310 an indication of how many transaction records 312 from the bundle 304 were written to the output image cash letter file 414. Similarly, at the conclusion of an image cash letter 302, the respective split-file objects 508 may update the associated image cash letter headers 306 in the associated output image cash letter files 414, 416 to indicate the number of bundles 304 and transaction records 312 are present in the respective files 414, 416. It will be appreciated that the various split-file objects 508, 510 may update file headers either at the conclusion of an image cash letter 302 or bundle 304 as described above, or as individual transaction and item records are received. Also, according to various embodiments, the respective split-file objects 508, 510 may be configured not to include empty bundles 304 or image cash letters 302. For example, upon receipt of a header indicating the end of a bundle 304 or image cash letter 302, the split-file object 508 may determine if the newly concluded bundle 304 or letter 302 included any entries in its associated image cash letter file 414. If there are no entries corresponding to the concluded bundle 304 or letter 302 in the cash letter file 414, then the split-file object 508 may delete the header for the empty cash letter 302 or bundle 304 from the file 414. The split-file object 510 may perform similarly with regard to the output cash letter file 416. In this way, the output cash letter files 414, 416 may not include empty bundles 304 or cash letters 302.

Figure 6:
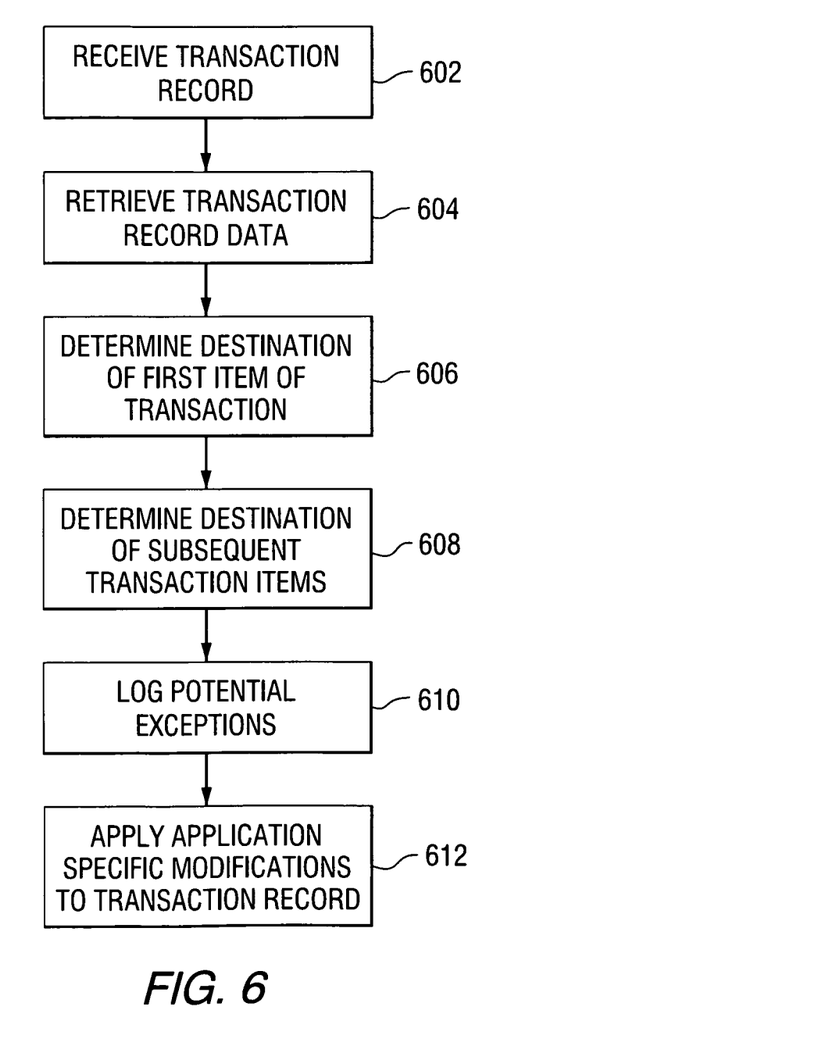
FIG. 6 is a flowchart showing one embodiment of a process flow that may be implemented by the splitter object shown in FIG. 5 to assign a transaction record to an appropriate output image cash letter file.

FIG. 6 is a flowchart showing one embodiment of a process flow 600 that may be implemented by the splitter object 504 to assign a transaction record to an appropriate output image cash letter file. It will be appreciated that each transaction record 312 may comprise one or more items (e.g., credits or debits). In a properly constructed transaction record 312, the sum of the debits may equal the sum of the credits.

The splitter object 504 may receive a transaction record 312 at 602. At 604, the splitter object 504 may receive additional data describing the transaction record. For example, the transaction record 312 may indicate a routing/transit (R/T) number describing the account to which it is directed. The splitter object 504 may utilize the R/T number with a look-up table, or other suitable mechanism, to derive additional information about the transaction record 312. The additional information may include, for example, a destination indicating the image exchange system corresponding to the account, an application code describing a type of the transaction, and/or other relevant information.

At 606, the splitter object 504 may determine a destination image exchange system of the first item (credit or debit) of the transaction record 312 and direct the item to the appropriate output file (e.g., via the appropriate split-file object 508, 510). According to various embodiments, the conversion table 414 (shown in FIG. 4) may be utilized to determine which image exchange system handles the account associated with the first transaction item. In embodiments where accounts handled by a first image exchange system are being migrated to a second image exchange system, items indicated as being directed to the second image exchange system may be so directed. The conversion table 414 may be utilized to determine items that are nominally directed to the first image exchange system, but properly directed to the second system (e.g., due to the migration of an associated account from the first system to the second system). In some embodiments, the conversion table 414 may be utilized to determine the destination of each item.

At 608, the splitter object 504 may determine a destination for subsequent items in the transaction record and direct the subsequent items to the proper output file 414, 416 and/or split-file object 508, 510. The destination of the subsequent items may be found, for example, in a manner similar to that described above with respect to the first item in a transaction record 312. According to various embodiments, the splitter object 504 may maintain transaction integrity. For example, a subsequent item may be directed to the same image exchange system as the first item in a transaction, regardless of its indicated destination. Keeping all items in a transaction together may avoid the need to individually settle any items or transactions between the target image exchange systems. If a subsequent item indicates a destination image exchange system different than that of the first item in a transaction record 312, this may indicate a potential error or exception in the input image cash letter file 102. The potential exception may be written to a log 418 (FIG. 4) at 610.

In various embodiments, application-specific modifications may be made to an item or transaction (614) before it is written to the appropriate output file 414, 416. These changes may be made by the splitter object 504, the appropriate split-file object 508, 510, or any other suitable system component. The changes may be necessary for specific account/transaction types as part of a conversion from a first image exchange system to a second. Changes may or may not be necessary for a transaction or item, for example, based on the transaction's application type. For example, a first class of transaction application types may include those drawn on or deposited to a demand deposit account (DDA) or a savings account (S). Transactions of these application types may be generically referred to as DDA application transactions. According to various embodiments DDA application transactions may not require modification before they are written to an output image cash letter file 414, 416.

A second class of transaction application types may include general ledger (G/L) transactions. G/L transactions may generally include items and/or transactions that are classified as Adjustments, Cash, General Ledger (G/L) and other internal transactions or items. It will be appreciated that G/L transactions and items may require updated Magnetic Ink Character Recognition (MICR) entries in order to be properly moved from one image exchange system to another. For example, the existing MICR number of a transaction or item may be substituted for the MICR number of the new image exchange system to which the item or transaction will be directed. The new MICR number may be derived in any suitable way. For example, a look-up table may link legacy MICR numbers to new MICR numbers.

Also, for example, the "on-us" nature of a transaction may be updated. The "on-us" field may indicate whether a transaction is drawn on an account handled by the financial institution holding the subject account, or on an account handled by a third party institution. When a transaction or item is transferred from one image exchange system to another, this may affect whether the transaction is "on-us." Accordingly, an item or transaction may be appropriately updated before being written to an output image cash letter file 414, 416.

In addition, system specific changes may be made to an item or transaction, for example, by the splitter object 504 or by the respective split-file objects 508, 510. For example, a first one of the target image exchange systems 112, 114 may utilize a zeroed item record to indicate a float time for the transaction, while a second of the target image exchange systems 112, 114 may not. Accordingly, when such an item record is converted to the format of the first system, the zeroed float item may be added. When such an item record is converted to the format of the second system, such a zeroed float item may be dropped. Because the balance of the zeroed float item is zero, adding or dropping it may not have any effect on the integrity of the transaction.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the splitter system and various objects described herein may be configured and/or programmed to include one or more of the above-described electronic, computer-based elements and components. In addition, these elements and components may be particularly configured to execute the various rules, algorithms, programs, processes, and method steps described herein. For example, the systems of FIGS. 1 and 2 may be implemented with one or more of the above-described electronic computer-based elements and components. Also, for example, the workflow diagram of FIG. 4 and the process flow of FIG. 6 may be implemented and/or executed by one or more of the above-described electronic computer-based elements and components.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for processing image cash letter files comprising image cash letters having transaction records directed to a first image exchange system and transaction records directed to a second image exchange system, the method comprising:
   receiving, by a computer system comprising at least one processor and an associated memory, an input cash letter file comprising at least one image cash letter, wherein the at least one image cash letter comprises transaction records directed to a first image exchange system and a second image exchange system;
   generating, by the computer system, a first output cash letter file destined for the first image exchange system, wherein the generating comprises generating a first output cash letter file header based on a header of the input cash letter file;
   generating, by the computer system, a second output cash letter file destined for the second image exchange system, wherein the generating comprises generating a second output cash letter file header based on the header of the input cash letter file;
   for each transaction record in the at least one input cash letter:
      conditioned upon a first transaction record being directed to an account associated with the first image exchange system:
         writing, by the computer system, the first transaction record to the first output cash letter file; and
         updating, by the computer system, the first output cash letter file header to indicate the presence of the first transaction record; and
      conditioned upon a second transaction record being directed to an account associated with the second exchange system:
         writing, by the computer system, the second transaction record to the second output cash letter file; and
         updating, by the computer system, the second output cash letter file header to indicate the presence of the second transaction;
   transmitting the first output cash letter file to the first image exchange system; and
   transmitting the second output cash letter file to the second image exchange system.

2. The method of claim 1, further comprising:
   for each transaction record in the at least one input cash letter:
      determining, by the computer system, whether a first item in the transaction record is directed to an account associated with the first image exchange system; and
      conditioned upon any subsequent items in the transaction record being directed to accounts that are not associated with the first image exchange system, writing to an exception log a description of the subsequent items not directed to accounts that are associated with the first image exchange system.

3. The method of claim 1, further comprising:
   for each transaction record in the at least one input cash letter:
      retrieving, by the computer system, an application type of the transaction record; and
      conditioned upon the transaction record being directed to an account associated with the first image exchange system, modifying the transaction record based on specifications of the first image exchange system specific to the application type.

4. The method of claim 1, further comprising validating the first output cash letter file and the second output cash letter file.

5. The method of claim 1, wherein a transaction record is directed to an account associated with the first image exchange system when a first item in the transaction record is directed to an account associated with the first image exchange system.

6. The method of claim 1, wherein the transaction records of the at least one input cash letter are divided into bundles, and wherein each bundle within the at least one input cash letter comprises a bundle header, the method further comprising, for a first bundle within the input cash letter, writing to the first output cash letter file a first bundle header based on a bundle header of the first bundle within the at least one input cash letter.

7. The method of claim 6, further comprising, conditioned upon no transaction records within the first bundle being directed to the first output cash letter file, deleting the first bundle header from the first output cash letter file.

8. A computer-implemented method for processing electronic cash letter files, the method comprising:
   receiving a first cash letter file, by a computer system comprising at least one processor and an associated memory, the first cash letter file comprising a first cash letter comprising transaction records directed to a first image exchange system and transaction records directed to a second image exchange system;
   executing, by the computer system, a parser object to parse the first cash letter;
   executing, by the computer system, a splitter object to:
      receive, from the parser object, at least one header record from the first cash letter;
      receive, from the parser object, a plurality of transaction records from the first cash letter;
      for each of the plurality of transaction records, determine an image exchange system to which the transaction record is directed;
   executing a first split-file object to:
      receive, from the splitter object, the at least one header record from the first cash letter;
      write the at least one header record to a first output cash letter file;
      receive, from the splitter object, first image exchange system transaction records selected from the plurality of transaction records that are directed to the first image exchange system;
      write the first image exchange system transaction records to the first output cash letter file;
      update the at least one header record at the first output cash letter file to reflect the first image exchange system transaction records;
   executing by the computer system a second split-file object to:
      receive, from the splitter object, the at least one header record from the first cash letter;
      write the at least one header record to a second output cash letter file;
      receive, from the splitter object, second image exchange system transaction records selected from the plurality of transaction records that are directed to the second image exchange system;
      write the second image exchange system transaction records to the second output cash letter file;
      update the at least one header record at the second output cash letter file to reflect the second image exchange system transaction records;
   transmitting, by the computer system, the first output cash letter file including transaction records that are directed to the first image exchange system to the first image exchange system; and
   transmitting, by the computer system, the second output cash letter file including transaction records that are directed to the second image exchange system to the second image exchange system.

9. The method of claim 8, further comprising validating the first output cash letter file and the second output cash letter file.

10. The method of claim 8, wherein determining, by the computer system, the image exchange system to which the transaction record is directed, comprises determining, by the computer system, an image exchange system to which a first item of the transaction record is directed.

11. The method of claim 8, wherein the splitter object is also configured to, conditioned upon any subsequent items in the transaction record being directed to accounts that are not associated with a same image exchange system as the first item, write to an exception log a description of the subsequent items not directed to accounts that are associated with the same image exchange system as the first item.

12. The method of claim 8, wherein the splitter object is also configured to determine an application of the transaction record.

13. The method of claim 12, wherein at least one of the splitter object and the split-file object is configured to modify a format of the transaction record based on the image exchange system to which the transaction record is directed and the application of the transaction record.

14. The method of claim 8, wherein the transaction records of the first cash letter are divided into bundles, and wherein each bundle within the first cash letter comprises a bundle header, wherein the splitter object is also configured to:
   for a first bundle within the first cash letter, write to the first output cash letter file a first bundle header based on a bundle header of the first bundle within the first cash letter.

15. The method of claim 8, wherein the first split-file object is also configured to:
   conditioned upon no transaction records within the first bundle being directed to the first output cash letter file, delete the first bundle header from the first output cash letter file.

16. The method of claim 1, wherein the first and second image exchange systems include first and second financial institutions.

17. The method of claim 1, wherein the transaction records comprise images of checks to be deposited and include indications of credits and debits making up the deposit.

* * * * *